(12) United States Patent
Kaperst

(10) Patent No.: US 8,540,148 B2
(45) Date of Patent: Sep. 24, 2013

(54) UNITARY MEMBERSHIP CARD

(71) Applicant: Michael Kaperst, Washington, DC (US)

(72) Inventor: Michael Kaperst, Washington, DC (US)

(73) Assignee: One Rack LLC, Lanham, MD (US)

( * ) Notice: Subject to any disclaimer, the term of this patent is extended or adjusted under 35 U.S.C. 154(b) by 0 days.

(21) Appl. No.: 13/623,918

(22) Filed: Sep. 21, 2012

(65) Prior Publication Data

US 2013/0015250 A1   Jan. 17, 2013

Related U.S. Application Data

(63) Continuation of application No. 12/292,396, filed on Nov. 18, 2008, now abandoned.

(51) Int. Cl.
*G06K 5/00*   (2006.01)

(52) U.S. Cl.
USPC ......................................................... 235/380

(58) Field of Classification Search
USPC .................... 235/379, 380, 382, 462.01, 487
See application file for complete search history.

(56) References Cited

U.S. PATENT DOCUMENTS

| 5,770,843 | A | * | 6/1998 | Rose et al. ..................... 235/380 |
| 6,494,367 | B1 | | 12/2002 | Zacharias |
| 6,742,704 | B2 | | 6/2004 | Fitzmaurice et al. |
| 2006/0081702 | A1 | | 4/2006 | Nandakumar |
| 2007/0007348 | A1 | | 1/2007 | Shah |

OTHER PUBLICATIONS

International Search Report issued in PCT Application No. PCT/US2009/006163 dated as mailed Dec. 24, 2009.

* cited by examiner

*Primary Examiner* — Seung Lee
(74) *Attorney, Agent, or Firm* — Cozen O'Connor

(57) ABSTRACT

Multiple membership accounts can be managed using a single, unitary membership card.

5 Claims, No Drawings

UNITARY MEMBERSHIP CARD

CROSS-REFERENCE TO RELATED APPLICATIONS

The present application is a continuation of application Ser. No. 12/292,396, filed Nov. 18, 2008, which is incorporated herein by reference in its entirety.

FIELD OF THE INVENTION

The present invention relates to devices, methods and systems for managing multiple membership accounts a single, unitary membership card.

BACKGROUND OF THE INVENTION

Membership cards, such as health club cards, video rental cards, library cards, promotional cards, discount cards, and loyalty cards (e.g., frequent flyer cards, grocery discount cards, and the like) are widely used. The proliferation of such membership cards has escalated to the point where over 60% of the population in Europe possesses two or more loyalty cards, and nearly 80% of all grocery transactions in the U.S. take place with a membership card.

Membership cards may include a variety of different indicia to identify the card, the individual using the card, a membership account, an expiration date, and other information. The indicia may include a string of alphanumeric characters, a barcode, or an encoded magnetic strip attached to the card. In the case where barcodes are used as the indicia, an organization typically creates a membership card that includes only one such barcode.

Vendors that wish to track member activity typically want to ensure that each user of an account receive a membership card that is appropriately associated with the membership account. Unfortunately, these cards have taken over the space in people's wallets and purses.

Vendors have also issued smaller versions of their loyalty cards that are designed to be attached to a keychain. These devices contain only the basic indicia representing the membership identifier, such as a single barcode containing the owner's membership number. This has resulted in cumbersome key chains that burden the consumer just as much as the cards. The typical consumer now carries several cards in his wallet and a plethora of key chain tokens. Furthermore, while consumers are being bombarded with new card offers daily, they still have to carry credit cards, driver's licenses, and often choose to carry pictures of their loved ones as well.

In an attempt to reduce the number of such cards carried by an individual, bar code numbers have been provided to a card provider that prints several bar codes on one card. See, e.g., U.S. Patent Application Publication No. US 2007.0007348; www.one-der-card.com; www.justoneclubcard.com. These devices, however, are limited by the number of different membership accounts that can be incorporated without the card becoming too large.

There remains, therefore, a need for a single, unitary membership card that can replace a plurality of pre-existing membership accounts.

SUMMARY OF THE INVENTION

It is therefore an object of the present invention to provide devices, methods and systems by which all of the information required to interact with pre-existing membership accounts may be unified into one easy to carry accessory. It is further an object of this invention to provide a single device that may replace several memberships cards and/or key tags, and may be designed to operate with magnetic stripe readers and/or barcode readers from several different organizations that do not have a partnership or pre-existing relationship.

It is also an object of this invention to provide devices, method and systems by which card users may avoid having to carry multiple membership cards and/or key tags by consolidating the relevant information in a single account, which is accessed using a single device.

In accordance with these and other objects, a first embodiment of the present invention is directed to unitary membership card comprising: (i) a substrate; and (ii) means for storing an identifier corresponding to a plurality of membership data items. According to this embodiment, each of the plurality of membership data items corresponds to an independent membership account associated with a user. That is, the single identifier stored on the unitary membership card, such as a telephone number, is used to represent a plurality of different membership accounts, each of which has a particular membership number associated with it.

It is to be understood that both the foregoing general description and the following detailed description are exemplary and explanatory only and are intended to provide further explanation of the invention as claimed.

DETAILED DESCRIPTION OF PREFERRED EMBODIMENTS

A first preferred embodiment of the present invention is directed to unitary membership card comprising: (i) a substrate; and (ii) means for storing an identifier corresponding to a plurality of membership data items. According to this embodiment, each of the plurality of membership data items corresponds to an independent membership account associated with a user. That is, a single identifier stored on the unitary membership card, such as a telephone number, is used to represent a plurality of different membership accounts, each of which has a particular membership number associated with it.

The substrate may be in any suitable form or shape for a membership card, and the present invention is not limited to any particular form or shape. Thus, according to certain particularly preferred embodiments, the substrate may take the shape of a rectangular card or square card. According to other preferred embodiments, the substrate may take the shape of a key tag (e.g. for use with a key chain).

The inventive unitary membership card includes means for storing an identifier corresponding to a plurality of membership data items. Preferred means for storing include, but are not limited to, the following: bar codes; magnetic strips; smart chips; RFIDs; and combinations of two or more thereof.

According to certain particularly preferred embodiments of the present invention, the identifier corresponding to a plurality of membership data items is a unique alphanumeric string. More preferably, the unique alphanumeric string corresponds to a telephone number uniquely associated with the user. According to such embodiments of the present invention, the use of a telephone number as the identifier omits the need for a central database of membership accounts. This is because most merchants, or other card accepters, generally associate membership numbers with a user's telephone number(s) in their own databases (and can therefore access the appropriate membership information by entering the identifier stored on the unitary membership card). Such embodiments of the present invention are particularly useful in applications where the means for storing the identifier is a magnetic strip or barcode.

In addition to the membership data items, the unitary membership card may also contain personal identification information relating to the user, such as the following: one or more telephone numbers; one or more mailing addresses; one or more residential and/or work addresses; one or more email addresses; a social security number; and the like.

According to certain preferred embodiment of the present invention, the user, of multiple membership cards forwards at least one membership data item, such as a membership number, to a unitary membership card provider. This forwarding may be accomplished by any of a number of suitable methods, including forwarding individual membership cards directly to the unitary membership card provider or entering membership numbers using an internet website. The unitary membership card provider preferably incorporates the membership data item(s) into a database and generates a unique identifier corresponding to the user, such as the user's telephone number. The unitary membership card provider also generates a unitary membership card of the present invention and forwards it to the user. Upon receiving the unitary membership card, the user may present it at an independent entity's establishment for reading of the unique identifier and subsequent accessing of the associated membership data item(s).

As a user acquires new membership accounts, the user forwards at least one membership data item associated with each such account to the unitary membership card provider for inclusion in the database maintained by the unitary membership card provider.

The user may also forward one or more user preferences associated with one or more membership accounts (e.g. seat and meal preferences for a frequent flyer account, options/selection associated with a reward/loyalty program, etc.) and/or one or more user preferences associated with the unitary membership account.

The foregoing description and the following examples are illustrative only and are not intended to limit the scope of the invention as defined by the appended claims. It will be apparent to those skilled in the art that various modifications and variations can be made in the methods of the present invention without departing from the spirit and scope of the invention. Thus, it is intended that the present invention cover the modifications and variations of this invention provided they come within the scope of the appended claims and their equivalents.

What is claimed is:

1. A unitary membership card consisting of: (i) a substrate; and (ii) a bar code means for storing an alphanumeric identifier corresponding to a telephone number of a user; and (iii) wherein said alphanumeric identifier corresponding to a plurality of membership data items, each of said plurality of membership data items corresponding to an independent membership account associated with a user.

2. The unitary membership card according to claim 1, wherein said substrate is a card.

3. The unitary membership card according to claim 1, wherein said substrate is a key tag.

4. The unitary membership card according to claim 1, wherein said bar code further includes a plurality of user data items.

5. A unitary membership card consisting of: (i) a substrate card; and (ii) a bar code means for storing an alphanumeric identifier corresponding to a telephone number of a user; and (iii) wherein said alphanumeric identifiers corresponds to a plurality of user data items and a plurality of membership data items, and (iv) wherein each of said plurality of membership data items corresponding to an independent membership account associated with a user.

* * * * *